(12) United States Patent
Ishida et al.

(10) Patent No.: US 7,834,099 B2
(45) Date of Patent: Nov. 16, 2010

(54) IMIDE-NAPHTHOXAZINE COPOLYMER

(75) Inventors: Hatsuo Ishida, Shaker Heights, OH (US); Masanori Nakamura, Beachwood, OH (US)

(73) Assignees: Sekisui Chemical Co., Ltd., Osaka (JP); Case Western Reserve University, Cleveland, OH (US)

( * ) Notice: Subject to any disclaimer, the term of this patent is extended or adjusted under 35 U.S.C. 154(b) by 582 days.

(21) Appl. No.: 11/896,841

(22) Filed: Sep. 6, 2007

(65) Prior Publication Data

US 2009/0076229 A1  Mar. 19, 2009

(51) Int. Cl.
*C08G 73/16* (2006.01)
(52) U.S. Cl. ........................ 525/420; 525/427; 525/429; 525/436; 528/149; 528/153; 528/161; 528/170; 528/310; 528/340
(58) Field of Classification Search ................. 525/420, 525/427, 429, 436; 528/149, 153, 161, 170, 528/310, 340
See application file for complete search history.

(56) References Cited

U.S. PATENT DOCUMENTS 4,882,410 A * 11/1989 Neugebauer et al. ........ 528/170
7,147,920 B2 * 12/2006 Shiobara et al. ............. 428/414

FOREIGN PATENT DOCUMENTS

| JP | 7-090179 A | 4/1995 |
| JP | 7-316427 A | 12/1995 |

* cited by examiner

*Primary Examiner*—Ana L Woodward
(74) *Attorney, Agent, or Firm*—Sughrue Mion, PLLC (57) ABSTRACT

An imide-naphthoxazine copolymer comprising a repeating unit represented by General Formula (1) below:

Formula (1)

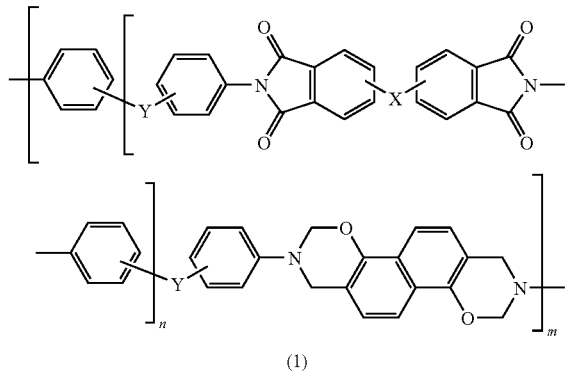

(1)

Formula (2)

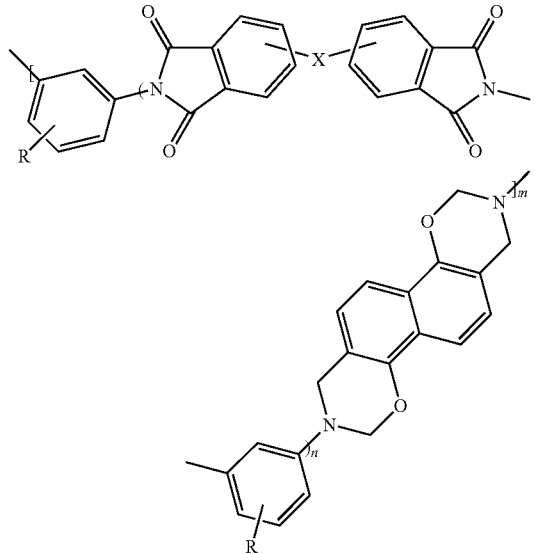

(2)

(wherein X and Y independently represent a single bond, an oxygen atom, a carbonyl group, or an organic group which may be substituted by a heteroatom;
R represents $CH_3$ or H,
n represents an integer from 1 to 10; and m represents an integer from 1 to 20).

4 Claims, 2 Drawing Sheets

IMIDE-NAPHTHOXAZINE COPOLYMER

FIELD OF THE INVENTION

The present invention relates to an imide-naphthoxazine copolymer, and more particularly to an imide-naphthoxazine copolymer with excellent solubility, heat resistance, and mechanical strength.

DESCRIPTION OF THE RELATED ART

Among the various types of plastics, imide resins are widely used not only as raw materials for electronics and electrical equipment, but also in fields ranging from aerospace to electronic communications because of their superior heat resistance, low temperature performance, chemical resistance, electrical properties, and the like.

The polyimide varnishes used in the above fields can generally be divided into the polyamic acid type, which are polyimide precursors, and the soluble polyimide type. With the former, a polyamic acid varnish is applied to the surface of a material to be coated, and then a polyimide resin molded object is obtained by performing a heat treatment to simultaneously remove the solvent and conduct an imidization reaction. Therefore, a high temperature of 300° C. or more is generally necessary for the heat treatment. On the other hand, the latter is rendered soluble by inserting a flexible molecular chain into the molecular scaffold, inserting a group that increases the intramolecular distance between the imide rings, and the like. Because the imidization reaction goes to completion and a molded object can be obtained from the varnish simply by removing the solvent, the soluble polyimide type is advantageous because a molded object can be formed at a lower heat treatment temperature than with the polyamic acid type. This type is also superior from the standpoint of molding and processing because the viscosity of the varnish changes little during storage.

However, in exchange for increased solubility of a polyimide resin, the heat resistance and mechanical strength decrease, and the decrease in mechanical strength in particular has been a major obstacle to expanding the scope of use of soluble polyimide. Because all of these properties are attributable to the molecular scaffold, it has been extremely difficult to achieve both solubility and mechanical strength, and thus no effective process has been known up to this point.

For example, Japanese Patent Application Laid-open No. H7-316427 proposes a polyimide film containing a polyether imide together with a bismaleimide resin as a method for increasing the mechanical strength of the polyimide resin. The polyimide resin disclosed therein is a polyimide resin obtained by the addition reaction of a maleimide and a diamine, and it is not a condensation type soluble polyimide resin. As a result, not only does that polyimide film require a chlorine-containing solvent, but the mechanical strength thereof is also unsatisfactory.

Moreover, Japanese Patent Application Laid-open No. H7-090179 discloses a polyaniline/polyimide composite molded object with excellent mechanical strength obtained by heating a polyaniline/polyamic acid together and molding the same. However, the mechanical strength of this composite molded object hardly differs from the corresponding polyimide resin, and that invention does not improve the mechanical strength of the polyimide resin.

BRIEF SUMMARY OF THE INVENTION

In light of the above, the problem to be solved by the present invention is to provide a novel imide copolymer with excellent solubility that can impart a high level of heat resistance and mechanical strength to a molded object thereof obtained by hot forming.

The inventors conducted diligent research on the above problem and discovered that an imide-naphthoxazine copolymer that comprises an imide polymer unit and a naphthoxazine unit as comonomer that copolymerizes with the imide unit thereof can solve that problem, thus completing the present invention.

In other words, the present invention comprises the following features.

1. An imide-naphthoxazine copolymer comprising a repeating unit represented by General Formula (1) or (2) below:

(wherein X and Y independently represent a single bond, an oxygen atom, a carbonyl group, or an organic group which may be substituted by a heteroatom;
R represents CH₃ or H;
n represents an integer from 1 to 10; and m represents an integer from 1 to 20).

2. The imide-naphthoxazine copolymer according to (1) above, wherein the organic group which may be substituted by the heteroatom is either —CH₂—, —C(CH₃)₂—, —C(CF₃)₂— or any of the groups of General Formula (3) below.

Formula (3)

-continued (3)

3. The imide-naphthoxazine copolymer according to (2) above, wherein X is a carbonyl group or —C(CF₃)₂—.

4. The imide-naphthoxazine copolymer according to (2) above, wherein Y is an oxygen atom.

The imide-naphthoxazine copolymer obtained by the present invention can be easily dissolved in various solvents during fabrication. Moreover, a molded object obtained by hot forming the imide-naphthoxazine copolymer of the present invention can be suitably used for electrical and electronics parts, automobile parts, coppered laminated circuit boards, printed wiring boards, a fireproof coating, composite matrix resin, and the like because it has superior heat resistance and mechanical strength.

DETAILED DESCRIPTION OF THE INVENTION

The imide-naphthoxazine copolymer of the present invention is a novel resin comprising a repeating unit represented by General Formula (1) or (2) and being a thermosetting resin wherein a ring-opening, crosslinking polymerization reaction occurs with heating, and a crosslinked structure is formed in which phenolic hydroxyl groups are generated without producing volatiles. The imide-naphthoxazine copolymer of the present invention contains an imide unit and a naphthoxazine unit in the following repeating unit:

Formula (1)

(1)

(2)

(wherein X, Y, R, n, and m are the same as defined above).

In Formula (1) or (2) above, X and Y independently represent a single bond, oxygen atom, carbonyl group, or organic group optionally substituted by a heteroatom.

The present invention does not particularly limit the aforementioned organic group optionally substituted by a heteroatom, but preferably it is —$CH_2$—, —$C(CH_3)_2$—, —$C(CF_3)_2$—, or any of the groups of General Formula (3) below.

Formula (3)

(3)

Preferably X is a carbonyl group or —$C(CF_3)_2$—, and more preferably is a carbonyl group because the solubility and mechanical strength tend to be excellent therewith.

Preferably Y is an oxygen atom or —$CH_2$—, and more preferably is an oxygen atom because the and solubility and mechanical strength tend to be excellent therewith.

In General Formula (1) or (2) above, n represents the average number of repetitions of the imide unit and is an integer from 1 to 10, preferably an integer from 1 to 3. If n is 0, the heat resistance and mechanical strength tend to be poor, and if n is greater than 10, the solubility tends to be poor.

Through the condensation polymerization of naphthoxazine units and imide units the present invention makes it possible to impart excellent solubility to the imide-naphthoxazine copolymer obtained thereby.

In General Formula (1) or (2) above m represents the average number of repetitions of the imide-naphthoxazine unit and is an integer from 1 to 20, preferably 2 to 10. If m is 0, the heat resistance and mechanical strength tend to be poor, and if m is greater than 20, the solubility tends to be poor.

Process for Producing the Imide-naphthoxazine Copolymer

The imide-naphthoxazine copolymer of the present invention can be produced by various methods, and for example, it can be produced by using the following scheme:

Formula (4)

(4)              (5)

(wherein X, Y, n and m are defined as above, and R' represents a hydrogen atom or optionally substituted alkyl group).

(wherein X, n and m are defined as above, and R and R' represent a hydrogen atom or optionally substituted alkyl group).

The above is a process wherein the imide unit represented by (6) and (8) is prepared by copolymerization of the diphthalic anhydride represented by (4) and the diamine compound represented by (5) and (7), and then that imide unit is copolymerized with 1,5-dihydroxynaphthalene and an aldehyde compound. This process is preferred because the molecular weight of the imide unit can be controlled within a predetermined range, and formation of a precipitate caused by crystallization of the imide molecule during the reaction can be prevented.

For the starting materials, commercial products of the diphthalic anhydride represented by (4) and diamine compound represented by (5) and (7) can be used without change, or they can be manufactured by commercial products using publicly known methods.

Preparation of the Imide Unit

The imide unit can be prepared, for example, by heating and reacting the diphthalic anhydride represented by (4) and the diamine compound represented by (5) or (7) in a suitable solvent.

The present invention does not particularly limit the ratio of the diphthalic anhydride to the diamine, but a diphthalic anhydride/diamine ratio (in moles) of 0.5 to 1.0 is preferred, and a ratio of 0.6 to 0.8 is more preferred.

The present invention does not particularly limit the solvent used provided it is one wherein the starting materials are soluble to a certain extent, and it does not interfere with the reaction. Examples include N-methyl pyrrolidone, dimethyl acetamide, dimethyl sulfoxide, dimethyl formamide, and the like, and N-methyl pyrrolidone is preferred because the solubility of the imide unit is excellent therein. In addition, it is preferable to use a solvent treated by distillation and desiccation from the standpoint of preventing deactivation of the diphthalic anhydride.

The present invention does not particularly limit the reaction temperature or reaction time, but generally a temperature of about 100° C. to 180° C. and a reaction time of 10 min to 5 h is acceptable. In the present invention a temperature of 140 to 160° C. and time of 30 min to 2 h is preferred from the standpoint of preventing side reactions during the process.

In addition, removal of water generated during the reaction to outside of the reaction system provides a more effective means of conducting the reaction. It is possible to precipitate out the polymer by adding a large volume of a poor solvent such as methanol to the reaction liquid after the reaction, and the target imide unit can be obtained by isolating and drying the precipitate.

Manufacture of the Imide-naphthoxazine Copolymer

The imide-naphthoxazine copolymer can be manufactured, for example, by heating and reacting the imide unit obtained above with 1,5-dihydroxynaphthalene and an aldehyde compound in a suitable solvent.

The present invention does not particularly limit the ratio of the imide unit to 1,5-dihydroxynaphthalene, but an imide unit/1,5-dihydroxynaphthalene ratio (in moles) of 0.5 to 1.5 is preferred and a ratio of 0.9 to 1.1 is more preferred.

The present invention does not particularly limit the aldehyde compound, and for example, formaldehyde, acetaldehyde, propionaldehyde, butylaldehyde and the like can be used. Among these, formaldehyde is preferred because of excellent reactivity thereof. Formaldehyde can be used in the form of paraformaldehyde, which is a polymer thereof, formalin, which is the water soluble form thereof, and the like.

The present invention does not particularly limit the amount of aldehyde compound used, but an imide unit/aldehyde compound ratio (in moles) of 0.125 to 0.3 is preferred, and a ratio of 0.20 to 0.25 is more preferred.

The present invention does not particularly limit the solvent used provided it is one wherein the starting materials are soluble to a certain extent, and it does not interfere with the reaction. Examples include N-methyl pyrrolidone, dimethyl acetamide, dimethyl sulfoxide, dimethyl formamide, and the like, and N-methyl pyrrolidone is preferred because the solubility of the imide unit is excellent therein.

The present invention does not particularly limit the reaction temperature or reaction time, but the reaction temperature is generally from room temperature to about 120° C. and the reaction time is generally from 5 min to 2 h. In the present invention a temperature of normal temperature to 80° C. and time of 20 min to 1 h is preferred from the standpoint of preventing problems such as side reactions.

It is possible to precipitate out the polymer by adding a large volume of a poor solvent such as methanol to the reaction liquid after the reaction, and the target imide-naphthoxazine copolymer can be obtained by isolating and drying the precipitate.

Preferably, the molecular weight of the imide-naphthoxazine copolymer is 5000 to 100000, and more preferably is 10000 to 30000. If the molecular weight is lower than the above range, the heat resistance and mechanical strength tend to be poor, and if the molecular weight is greater than the above range, the solubility tends to be poor. The term molecular weight referred to herein means the weight-average molecular weight measured by SEC (size exclusion chromatography).

In addition, it is possible to obtain a film, sheet, and the like by applying the post-reaction liquid to a substrate, evaporating the solvent by heating at 100 to 200° C. for 30 min to 2 h, and then heating at 200 to 300° C. for 30 min to 2 h so as to set the resin.

Because the imide-naphthoxazine copolymer of the present invention has a dihydronaphthoxazine ring in its structure, a ring-opening, crosslinking reaction occurs with heating, and it becomes a strong cured resin (molded object).

The imide-naphthoxazine copolymer of the present invention has excellent solubility and can impart a high level of heat resistance and mechanical strength to a molded object thereof obtained by hot forming. Therefore, the imide-naphthoxazine copolymer of the present invention can easily be fabricated into a film, and the like, and the obtained molded object thereof can be suitably used for electrical and electronics parts, automobile parts, coppered laminated circuit boards, printed wiring boards, a fireproof coating, composite matrix resin, and the like because it has superior heat resistance and mechanical strength.

EXAMPLES

The present invention is explained in greater detail below through the Examples, but the present invention is by no means limited to the examples described below. Hereinafter, the symbol % refers to wt %.

Measurement Methods

The measurement methods of physical properties, etc., used in this Specification are noted below.

(1) Infrared Absorption Spectroscopy

Bomem-Michelson MB100 FT-IR spectrometer

KBr pellet method used in dry air with 32× scans (2) Nuclear Magnetic Resonance Spectroscopy
Varian Inova $^1$H NMR (600 MHz)
Deuterated dimethyl sulfoxide used as an internal reference with 256× transients and relaxation time of 10 s.
(3) Resistance to Thermal Decomposition
Using a high resolution 2950 thermogravimetric analysis apparatus (TA Instruments), the 5% weight loss temperature (Td5) was measured at a temperature increase rate of 5° C./min.
(4) Tensile Strength
Instron Universal Testing Machine (Model 5565)
(Sample piece (Type V ASTM D6-38-03)
Cross-head speed of 1 mm/min
(5) Heat Resistance (Char Yield)
Using a high resolution thermogravimetric analysis apparatus (TA Instruments), the residual weight at 800° C. to the initial weight was obtained under a nitrogen stream with a flow rate of 90 mL/min and a temperature increase rate of 20° C./min.
Synthesis of Imide-naphthoxazine Copolymer Example 1

The synthesized imide oligomers were precipitated in 100 g of methanol with vigorous stirring. After the precipitated solid was filtered, it was rinsed with methanol. The powder obtained thereby was vacuum dried for 24 h in a vacuum oven heated to 100° C.

Figure 1:
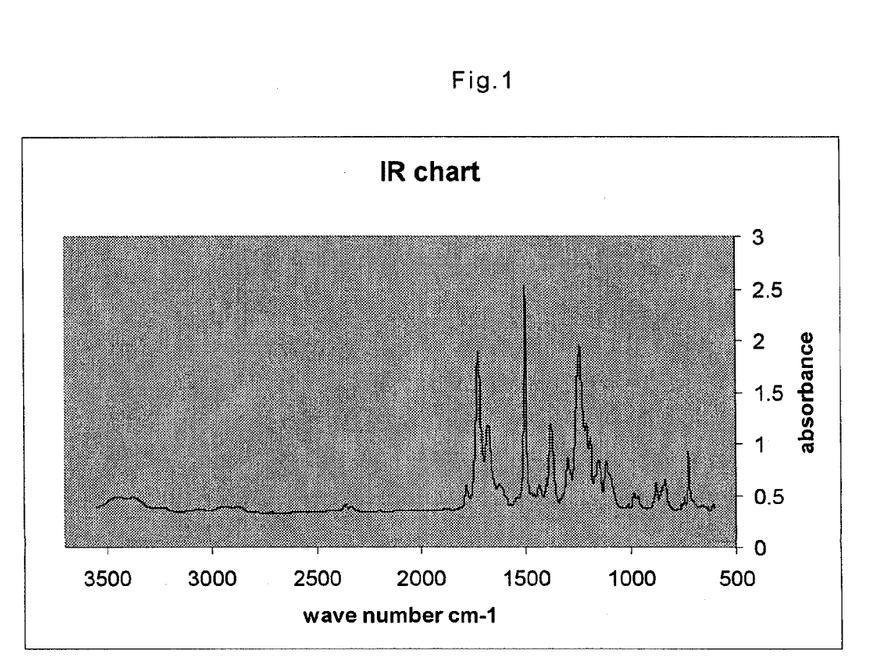
FIG. 1 represents an infrared absorption spectrum (IR spectrum) of the imide unit of Example 1.

FIG. 1 shows the infrared absorption spectrum (IR spectrum) of the obtained imide unit.

Primary amine functional groups: 3439, 3372 cm$^{-1}$, imide functional groups: 1783, 1726 cm$^{-1}$, carbonyl functional group (benzophenone): 1683 cm$^{-1}$

(Synthesis of Imide-naphthoxazine Copolymer)

After 10 g of the imide oligomers prepared above, 1 g of 1,5-dihydroxynaphthalene (Aldrich Chemical Co., Inc.), and 80 g of N-methyl pyrrolidone were heated and dissolved with stirring in a 300 cc round bottom flask placed in an oil bath set at 120° C., the reaction mixture was cooled to room temperature. To this solution was added 2.2 g of formaldehyde (37% aqueous solution) (Aldrich Chemical Co., Inc.), and the mixture was used to cast a film under heat.

(Sheet Fabrication)

A solution of the above mixture was poured into a frame placed upon a fluororesin substrate, and the solvent was Formula (6)

(wherein n and m are defined as above)

(Preparation of Imide Unit)

N-methyl pyrrolidone (hereafter, abbreviated as NMP) that had been distilled and desiccated by passing through a molecular sieve (4A) was used as the solvent for the preparation of the imide unit.

Figure 2:
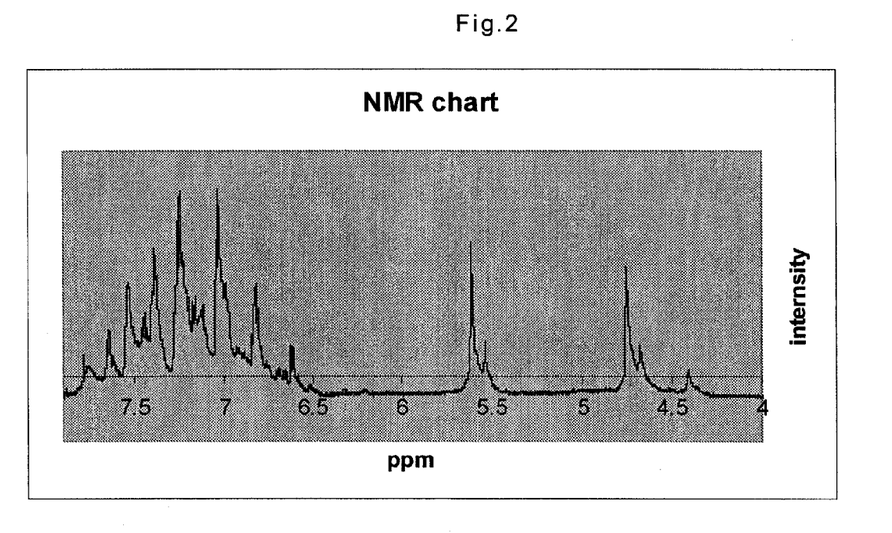
FIG. 2 represents a nuclear magnetic resonance spectrum (NMR spectrum) of the imide-naphthoxazine copolymer of Example 1.

In a 300 cc round bottom flask 6 g of 4,4-diaminodiphenyl ether (Lancaster, Ltd.) and 50 g of NMP were combined, and dissolution was performed by heating in an oil bath set to 170° C. Then, 5 g of 3,3',4,4'-benzophenone tetracarboxylic dianhydride (Aldrich Chemical Co., Inc.) was introduced into the flask all at once and the whole mixture was stirred vigorously. Next, 10 g of toluene was added, a Dean-Stark condenser was attached to the flask, the reaction was continued at 160° C. for 2 h while removing water generated during synthesis, and the reaction mixture was cooled to room temperature.

removed by evaporation in a hot air oven set at 120° C. (evaporation time: 60 min). A part of the sheet from which the solvent had been removed was dissolved in deuterated dimethyl sulfoxide and the nuclear magnetic resonance spectrum (NMR spectrum) was obtained. FIG. 2 shows the NMR spectrum of the imide-naphthoxazine copolymer.

The NMR spectrum shows two sharp peaks with nearly equal intensity near 5.6 ppm and 4.7 ppm that are characteristic of naphthoxazine rings, corresponding to the hydrogen atoms of —O—CH$_2$—N— and —ϕ—CH$_2$—N—, respectively.

Next, a curing reaction of the dried sheet was carried out for 1 h in an oven set to 250° C. As the ring-opening polymerization of the naphthoxazine progressed, the color of the sheet changed from brown to black.

Example 2

Formula (7)

(wherein n and m are defined as above)

Figure 3:
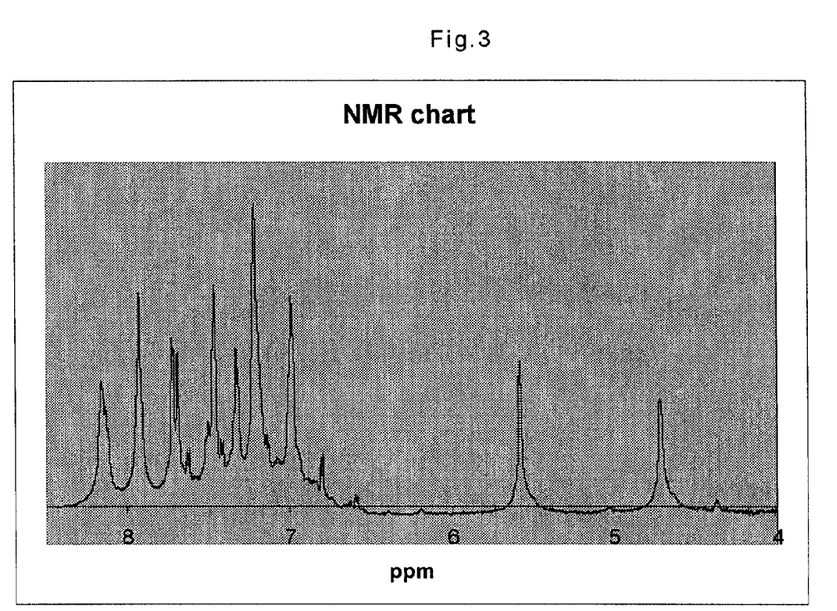
FIG. 3 represents a nuclear magnetic resonance spectrum (NMR spectrum) of the imide-naphthoxazine copolymer of Example 2.

Synthesis of an imide-naphthoxazine copolymer and manufacturing of a sheet thereof was performed using all the same procedures as in Example 1 except that 8 g of (4,4'-hexafluoro-isopropylidene) diphthalic anhydride (Aldrich Chemical Co., Inc.) was used in place of the 5 g of 3,3'-4,4'-benzophenone tetracarboxylic dianhydride (Aldrich Chemical Co., Inc.). FIG. 3 shows the NMR spectrum of the imide-naphthoxazine copolymer obtained thereby.

Comparative Example 1

(Imide Polymer)

Formula (8)

N-methyl pyrrolidone that had been distilled and desiccated by passing through a molecular sieve (4A) was used as the solvent for the preparation of the imide polymer.

In a 300 cc round bottom flask were combined 6 g of 4,4'-diaminodiphenyl ether (Lancaster, Ltd.) and 50 g of NMP, and dissolution was performed by heating in an oil bath set to 170° C. Then, 9 g of 3,3',4,4'-benzophenone tetracarboxylic dianhydride was introduced into the flask all at once and the whole mixture was stirred vigorously. Next, 10 g of toluene was added, a Dean-Stark condenser was attached to the flask, and the reaction was continued at 160° C. for 2 h while removing the water generated during synthesis. A large amount of precipitation was observed during the synthesis.

The polymer was precipitated in 100 g of methanol with vigorous stirring. After the precipitated solid was filtered, it was rinsed with methanol. The powder obtained thereby was vacuum dried for 24 h in a vacuum oven heated to 100° C. to obtain an polyimide powder. Because solubility was poor, evaluations for resistance to thermal decomposition and heat resistance were performed on the powder only.

Performance Evaluation

Using the various polymers and sheets obtained above, measurements for resistance to thermal decomposition (5% weight loss temperature), heat resistance (char yield) and tensile strength were performed, and Table 1 shows the results.

TABLE 1

| | 5% weight loss temperature | Char yield (800° C.) | Tensile strength |
|---|---|---|---|
| Example 1 | 505° C. | 75% | 70 MPa |
| Example 2 | 475° C. | — | 60 Mpa |
| Comp. Ex. 1 | 530° C. | 60% | Insoluble, sheet fabrication impossible |

As can be clearly seen from the above results, the imide-naphthoxazine copolymers of Examples 1 and 2 that have both imide and naphthoxazine units as chemical repeat units have excellent solubility, and it is possible to obtain a high level of heat resistance and mechanical strength to a sheet obtained by molding these polymers. In particular, the sheet of Example 1 showed a higher char yield than the imide polymer of Comparative Example 1. This is attributed to the inherently high heat resistance of naphthoxazine.

On the other hand, the solubility of the imide polymer of Comparative Example 1 was insufficient because it does not contain a naphthoxazine unit as a structural unit, and fabrication of a sheet thereof was impossible.

What is claimed is:

1. An imide-naphthoxazine copolymer comprising a repeating unit represented by Formula (1) or (2) below:

Formula (1)

(1)

(2)

Formula (2)

(wherein X and Y independently represent a single bond, an oxygen atom, a carbonyl group, or an organic group which may be substituted by a heteroatom;

R represents $CH_3$ or H;

n represents an integer from 1 to 10; and m represents an integer from 1 to 20).

2. The imide-naphthoxazine copolymer according to claim 1, wherein the organic group which may be substituted by the heteroatom is either —$CH_2$—, —$C(CH_3)_2$—, —$C(CF_3)2$— or any of the groups of Formula (3) below:

(3)

3. The imide-naphthoxazine copolymer according to claim 2, wherein X is a carbonyl group or —C(CF$_3$)$_2$—.

4. The imide-naphthoxazine copolymer according to claim 2, wherein Y is an oxygen atom.

* * * * *